July 6, 1954   J. LUDEMA   2,682,820
CULTIVATOR
Filed Aug. 14, 1948

INVENTOR.
Joe Ludema
BY
Glenn B. Morse
Attorney

Patented July 6, 1954

2,682,820

UNITED STATES PATENT OFFICE 2,682,820

CULTIVATOR

Joe Ludema, Hudsonville, Mich.

Application August 14, 1948, Serial No. 44,283

1 Claim. (Cl. 97—47.42)

This invention provides a cultivator which is adapted to position its ground-working tools with precision. The art of growing certain types of crops has developed to the point where the farmer finds it necessary to handle his machinery with great care in order to obtain the most from currently available knowledge as to how to obtain the greatest yield from a given area of land. It is well known that certain types of crops can be grown in a definite spaced relationship between one plant and the next, and between rows. This distance is known with such exactitude that it is possible to make good use of automatic planting machinery which locates such plants and rows within a definite pattern within very close tolerances. When these plants begin to develop, the equipment which is used to cultivate the area must be capable of performing with the same precision in order to be efficient, and if damage to the plants is to be avoided. The cultivating process is preferably conducted in very close relationship to the rows of plants, and any deviation of the cultivating equipment from the prescribed course will therefore endanger the plants themselves. The closeness with which it is possible to operate the cultivating equipment in relationship to the plant rows has therefore been determined by the accuracy with which such cultivating equipment may be held to its prescribed line of action. The items which tend to cause such equipment to deviate from its prescribed path are principally the deflection of various structural components under load, and the play caused from looseness of pivots, bearings, and other miscellaneous fastenings.

The experience of farmers with gang cultivators generally has caused a particular type of mechanism to evolve which is best adapted to this type of operation. This device is built around a tool-carrying member on which are mounted one or more ground-working tools, the tool-carrying member being attached to a fixed support on a carrying vehicle by means of a link mechanism which has a substantially parallel movement of the members in what is known as a "pantograph" movement. The purpose of such linkage is to maintain the tool-carrying member in a substantially parallel relationship with the ground so that the tool-carrying member may rise and fall while maintaining the relative position of the various tools. In addition to the ground-working tools which are carried by the tool-carrying member, a gauge wheel or skid is usually provided which establishes the distance from the ground at which the tool-carrying member operates. In this manner the depth of cut of the tools is maintained at a substantially constant amount, and the effect of the position of the carrying vehicle is removed. The tractor or cart may therefore pitch or roll with the varying contour of the ground without altering the operating position of the equipment.

The present invention provides a cultivator which operates upon the general principles outlined above, but which contains improvements which make this general type of device operate with a great increase in accuracy. An arrangement of members is provided which minimizes the deflection of the over-all structure under load, and which also minimizes the play or looseness that accumulates in the various bearings and pivots which tends to cause inaccuracies in the positioning of the ground-working equipment. These desirable advantages are obtained while preserving a degree of simplicity which is not to be found in conventional machinery of this type.

A high degree of structural rigidity is obtained by the present invention by providing a pair of beams which are mounted transversely to the carrying vehicle and to which the links supporting the tool-carrying member are attached. Suitable hinge structure pivotally connects such links to the supporting beams, such links being normally disposed at an angle inclined to the vertical so as to permit the tool-carrying member to rise and fall with changes in position of the carrying vehicle without developing undue compression in the links themselves. The aforementioned links are preferably disposed in a vertical plane parallel to the movement of the carrying vehicle, and are provided with take-up means so that the play between journal and bearing of the hinge assembly can be minimized if not completely removed. In this manner the operation of the said links is maintained close to the exact plane in which they are intended to operate, which of course results in a more exact positioning of the tool-carrying member relative to its expected course of travel. The use of spaced supporting beams rather than one single beam enables shorter lengths of cantilever structure to be used in the link system which results in minimizing the deflection of the various parts under side load and greater directional stability of the tool-carrying member. The plurality of beams itself also increases rigidity. These characteristics combine to produce a cultivating machine which may be held to a much closer line of operation than is the case with devices heretofore known.

In the preferred form of the invention the spanwise locating beams are formed with a circular cross section, and act as journals for the link bearings in addition to their function as supports. In this way the maximum in simplicity of construction is obtained. Preferably, the hinges connecting the links to the support beams are formed with two spaced bearing portions with a locating collar fitting closely between these two portions. With this arrangement, one collar alone is sufficient to position the hinge unit axially along the support beam, the positioning being obtained by a clamping device.

This general arrangement wherein a support beam is utilized also as a journal for the link hinges enables the use of a very simple mechanism for raising and lowering the tool-carrying members to and from an operating position, as when the vehicle reaches the end of a row and it is desired to remove the tools from the ground while the vehicle is turned around into a new direction. The preferred form of this tool-elevating system comprises a series of cranks which are securely clamped to one of the supporting beams, and which are adapted to engage a link as such crank rotates about the beam axis. The beam itself is supported on suitable brackets on the carrying vehicle which contain bearings permitting the beam to be rotated about its axis. Means are also provided for applying torque to the beam which causes the cranks to rotate about the beam axis and to engage the various links with which they are associated. Continued rotation of the beams beyond this point causes the links contacted to rotate about their hinge axis and thereby elevate the tool-carrying members. Obviously the rotation need only be applied to one beam, it not being necessary to provide cranks on both of them due to the related action of the two links.

It has been found preferable to provide a carrying vehicle for the above discussed mechanism which has a small degree of castering to the front wheel. The purpose of such castering action is to apply a small degree of lateral movement the instant that the steering wheel is operated. In this manner it is possible to position the tool-carrying members much more quickly and with less effort than would be the case if it were necessary for all lateral positioning of the tools to be controlled by the forward movement of the vehicle.

The various features of this invention will be described in detail by an analysis of particular mechanism which is illustrated in the accompanying drawings. In these drawings.

Figure 1:
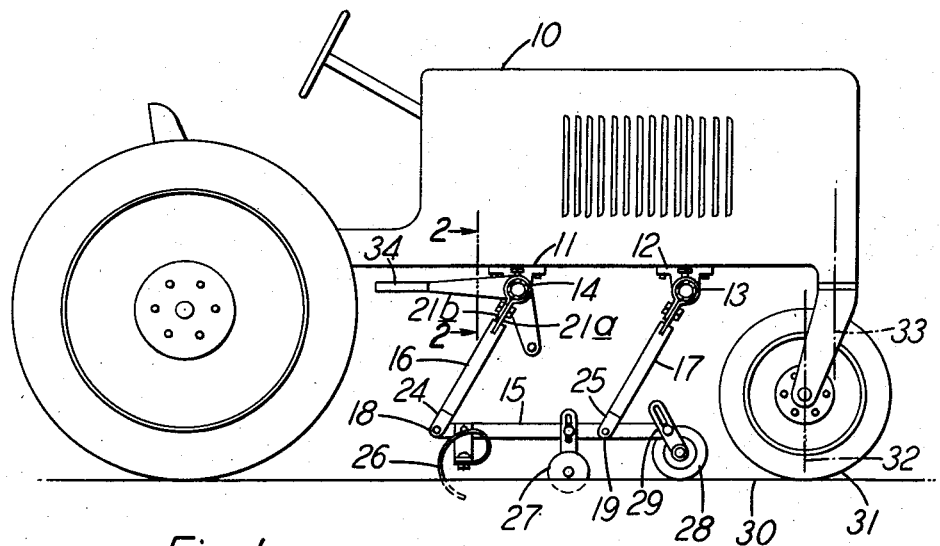
Figure 1 is a side view of a tractor which is equipped with a cultivator embodying the present invention, the view showing a section through a gang of devices, and indicating the construction of each unit of such gang.

Referring to Figure 1, the tractor 10 is shown provided with the brackets 11 and 12 which support the transverse beams 13 and 14 which are circular in cross section. These beams are supported within their respective brackets, at least beam 14 being rotatably supported for reasons which will be hereinafter indicated. At spaced intervals spanwise along the supporting beams 13 and 14, ground-working units are located which generally comprise the tool-carrying member 15 and the links 16 and 17 which connect the tool-carrying member to the support beams 13 and 14 at the pivot points 18 and 19 (in addition to the axis of the support beams which also act as pivot points). Preferably the four pivot points set out as shown form a parallelogram which causes the links 16 and 17 to maintain a parallel relationship as each rotates about its support beam 13 or 14, resulting in a movement of the tool-carrying member 15 in which it remains substantially parallel to the ground level.

Figure 2:
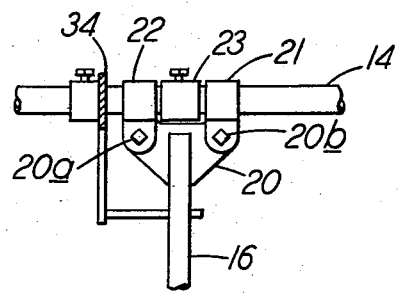
Figure 2 illustrates an enlarged view of the hinge unit which pivotally connects the links with the supporting beams.

The preferred hinge mechanism for connecting the links 16 and 17 to the support beams 13 and 14 is best indicated in Figure 2. The link 16 is provided with the beaming member 20 which comprises two separate bearing portions 21 and 22. Between these bearing portions, the locating collar 23 is clamped in position axially along the supporting beam 14, thus serving to definitely locate the position of the link 16. Preferably, the amount of end-play between the spaced bearing portions 21 and 22 and locating collar 23 is kept to a minimum. Each of the bearing portions 21 and 22 is provided with clearance-reducing means which preferably take the form of a clamp arrangement adapted to reduce the bearing diameter to the point where it closely cooperates with the diameter of the journal provided by the supporting beam 14. The bearing portions 21 and 22 are adapted to provide for such reduction in bearing diameter by being formed as discontinuous collars which are provided with bolts 20a and 20b or other means for closing the amount of the discontinuity of such collars. To accomplish this general construction, the most practical arrangement has been to bend a strap of material around a suitable form leaving a pair of parallel members such as 21a and 21b which are not quite in contact when the inner diameter of the bearing member closely approximates that of a supporting journal. A bolt 20b passed through such parallel members and tightened will serve to reduce the inner diameter of the bearing to a point where such bearing will closely cooperate with its journal.

The attachment of the link 16 or 17 to the tool-carrying member 15 is preferably accomplished by the fork-shaped end pieces 24 and 25. The tool-carrying member 15 provides a support for the various ground-working equipment which includes (in the device shown in Figure 1) the spring tooth 26, the disc 27, and the gauge wheel 28. The gauge wheel 28 is supported on an arm 29 which is provided with a slot permitting adjustment of the gauge wheel with respect to the tool-carrying member 15. Such adjustment serves to vary the position of the gauge wheel with respect to the beam in a vertical direction, which serves to position the ground-working tools 26 and 27 at various depths below the surface of the ground 30.

The tractor or other carrying vehicle is preferably provided with a castering steering wheel in the front as indicated at 31. The amount of castering is indicated by the distance which the axis of rotation of the steering wheel 31 (indicated at 32) is disposed behind the steering axis 33. The distance of the one axis behind the other causes the front end of the tractor to move laterally the instant the steering wheel is turned, even though there be no forward motion of the tractor at that time. Such lateral movement facilitates the control of the tractor to accurately position the various ground-working tools in their required relationship with the plant rows. Such a castering provision enables the tractor to make a more full use of the precision toolpositioning system which has been described in previous paragraphs.

The operation of the tool-lifting system by the operator of the tractor can be accomplished by any general system of levers or gears for applying torque to the beam. The use of such a lever is indicated at 34 in Figures 1 and 2, and it is preferable to provide such a lever with locking means (not shown) to secure it in any selected position. The entire assembly associated with the beams including the brackets, is arranged as shown to be laterally insertable between the front and rear wheels, and secured in position by attaching the brackets to the vehicle. The particular mechanisms which are shown in the accompanying drawings and which are discussed herein are presented for illustrative purposes only, and are not to be considered as limitations upon the scope of this invention established by the appended claim.

I claim:

In combination with a vehicle having front and rear wheels, a cultivator, comprising: a plurality of supporting beams; bracket means adapted to secure the central portion of each of said beams to said vehicle transversely thereto and between said front and rear wheels, said beams being substantially parallel, and at least one of said beams being rotatable about its axis in said bracket means; a plurality of tool-carrying members; link means pivotally connecting each of said beams to said tool-carrying members at spaced points thereon, respectively; crank means mounted on said rotatable beam adjacent each of said link means connected to said rotatable beam, said crank means having a portion disposed to intercept said adjacent link means on rotation of said beam; and lever means adapted to rotate said beam, said assembly of beams, bracket means, crank means, lever means, link means, and tool-carrying members being laterally insertable between the front and rear wheels of said vehicle.

References Cited in the file of this patent

UNITED STATES PATENTS

| Number | Name | Date |
| --- | --- | --- |
| 401,114 | Berger | Apr. 9, 1889 |
| 521,761 | Day | June 18, 1894 |
| 621,741 | Blackburn | Mar. 21, 1899 |
| 821,083 | Brookbank | May 22, 1906 |
| 1,301,251 | Graves | Apr. 22, 1919 |
| 1,408,213 | Locke | Feb. 28, 1922 |
| 1,962,349 | Johnson | June 12, 1934 |
| 2,012,853 | Heitshu | Aug. 27, 1935 |
| 2,172,971 | Graham | Sept. 12, 1939 |
| 2,221,546 | Johnston et al. | Nov. 12, 1940 |
| 2,221,549 | Lindgren et al. | Nov. 12, 1940 |
| 2,239,332 | Mee | Apr. 22, 1941 |
| 2,247,367 | Frudden et al. | July 1, 1941 |
| 2,372,403 | Swanson | Mar. 27, 1945 |